United States Patent
Chang et al.

(10) Patent No.: US 8,014,175 B2
(45) Date of Patent: Sep. 6, 2011

(54) SWITCHING POWER CONVERSION CIRCUIT

(75) Inventors: Shih-Hsien Chang, Taoyuan Hsien (TW); Chih-Hsuan Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 409 days.

(21) Appl. No.: 12/414,512

(22) Filed: Mar. 30, 2009

(65) Prior Publication Data
US 2010/0128500 A1    May 27, 2010

(30) Foreign Application Priority Data
Nov. 26, 2008   (TW) ................................ 97145788 A

(51) Int. Cl.
*H02M 3/335* (2006.01)
*H02M 7/44* (2006.01)
(52) U.S. Cl. .................... 363/20; 363/21.01; 363/21.09; 363/21.17; 363/97; 323/299
(58) Field of Classification Search .................. 363/20, 363/21.01, 21.04, 21.09, 21.12, 21.17, 95, 363/97; 323/299, 301
See application file for complete search history.

(56) References Cited

U.S. PATENT DOCUMENTS

| | | | |
|---|---|---|---|
| 5,289,360 A * | 2/1994 | Canova | 363/21.02 |
| 6,717,827 B2 * | 4/2004 | Ota | 363/21.12 |
| 2003/0117818 A1 * | 6/2003 | Ota | 363/47 |
| 2008/0278138 A1 * | 11/2008 | Wei | 323/318 |

* cited by examiner

*Primary Examiner* — Bao Q Vu
(74) *Attorney, Agent, or Firm* — Kirton & McConkie; Evan R. Witt

(57) ABSTRACT

A switching power conversion circuit includes a power circuit, a feedback circuit and a control circuit. The power circuit includes a switching circuit and a first magnetic element. The first magnetic element generates a magnetic flux change by alternately conducting or shutting off the switching circuit, so that an input voltage is converted into the output voltage by the power circuit. The feedback circuit generates a feedback signal according to the output voltage. The control circuit is used for controlling an on duration and an off duration of the switching circuit, thereby maintaining the output voltage at a rated voltage. The off duration of the switching circuit is maintained at a constant interval under control of the control circuit. The on duration of the switching circuit is adjusted to be a specified interval smaller than a maximum on duration according to the magnitude of the input voltage.

20 Claims, 8 Drawing Sheets

SWITCHING POWER CONVERSION CIRCUIT

FIELD OF THE INVENTION

The present invention relates to a power conversion circuit, and more particularly to a switching power conversion circuit.

BACKGROUND OF THE INVENTION

A switching power conversion circuit principally comprises a switching circuit and at least a magnetic element. The magnetic element is for example a transformer or an inductor. By alternately conducting or shutting off the switching circuit of the switching power conversion circuit, the input power is converted by the magnetic element into an output voltage including at least a regulated voltage level. The output voltage is used to drive the load that is connected to the output terminal of the switching power conversion circuit. In addition, the magnetic element can be used to achieve voltage-increasing, voltage-decreasing, filtering or other purposes.

When the switching circuit of the switching power conversion circuit is alternately conducted or shut off, the magnetic element will generate corresponding magnetic flux according to the formula $B=V \times T_{on}/(T_s \times A)$, in which B is the magnetic flux, V is the input voltage of the switching power conversion circuit, $T_{on}$ is the on duration of the switching circuit, $T_s$ is the coil turn of the magnetic element, and A is an effective area passing through the magnetic flux. Generally, the on duration $T_{on}$ of the switching circuit is dependent on the output voltage to be transmitted to the load. As the output voltage is increased, the on duration $T_{on}$ of the switching circuit is extended. Since the coil turn $T_s$ and the effective area A are determined after the switching power conversion circuit is fabricated, the magnetic flux B is changed with the input voltage V and the on duration $T_{on}$ of the switching circuit.

The switching circuit is usually operated at a constant switching frequency. As the output voltage is increased, the on duration $T_{on}$ of the switching circuit is extended. The magnetic flux B generated may exceed the maximum saturation magnetic flux of the magnetic element. If the magnetic element is saturated, the impedance of the magnetic element becomes very small. Under this circumstance, the current flowing through the magnetic element becomes extremely large. Consequently, the magnetic element or other components of the switching power conversion circuit may be immediately burned out.

Moreover, the conventional switching power conversion circuit has a bootstrap circuit for driving the switching circuit at the high-voltage terminal of the switching power conversion circuit. Since the bootstrap circuit is very costly, the use of the bootstrap circuit increases extra cost. For solving these problems, some literatures have disclosed a method of adjusting the locations or the number of the switching circuit. Such a method, however, fails to precisely control the output current or the output voltage of the switching power conversion circuit, and thus the operation of the load is not optimized.

Therefore, there is a need of providing a switching power conversion circuit to obviate the drawbacks encountered from the prior art.

SUMMARY OF THE INVENTION

An object of the present invention provides a switching power conversion circuit for minimizing the possibility of immediately burning out the magnetic element and other components of the switching power conversion circuit.

Another object of the present invention provides a switching power conversion circuit with no additional bootstrap circuit in order to reduce the fabricating cost.

A further object of the present invention provides a switching power conversion circuit for precisely controlling the load current, so that the operation of the load is optimized.

In accordance with an aspect of the present invention, there is provided a switching power conversion circuit for converting an input voltage into an output voltage and issuing the output voltage to a load. The switching power conversion circuit includes a power circuit, a feedback circuit and a control circuit. The power circuit is interconnected between an input terminal of the switching power conversion circuit and the load, and includes a switching circuit and a first magnetic element. The first magnetic element generates a magnetic flux change by alternately conducting or shutting off the switching circuit, so that the input voltage is converted into the output voltage by the power circuit. The feedback circuit has an input terminal connected to an output terminal of the power circuit. The feedback circuit generates a feedback signal according to the output voltage. The control circuit is connected to the input terminal of the switching power conversion circuit, the switching circuit and an output terminal of the feedback circuit for controlling an on duration and an off duration of the switching circuit, thereby maintaining the output voltage at a rated voltage. The off duration of the switching circuit is maintained at a constant interval under control of the control circuit. The on duration of the switching circuit is adjusted by the control circuit according to the feedback signal. The on duration of the switching circuit is adjusted to be a specified interval smaller than a maximum on duration according to the magnitude of the input voltage.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
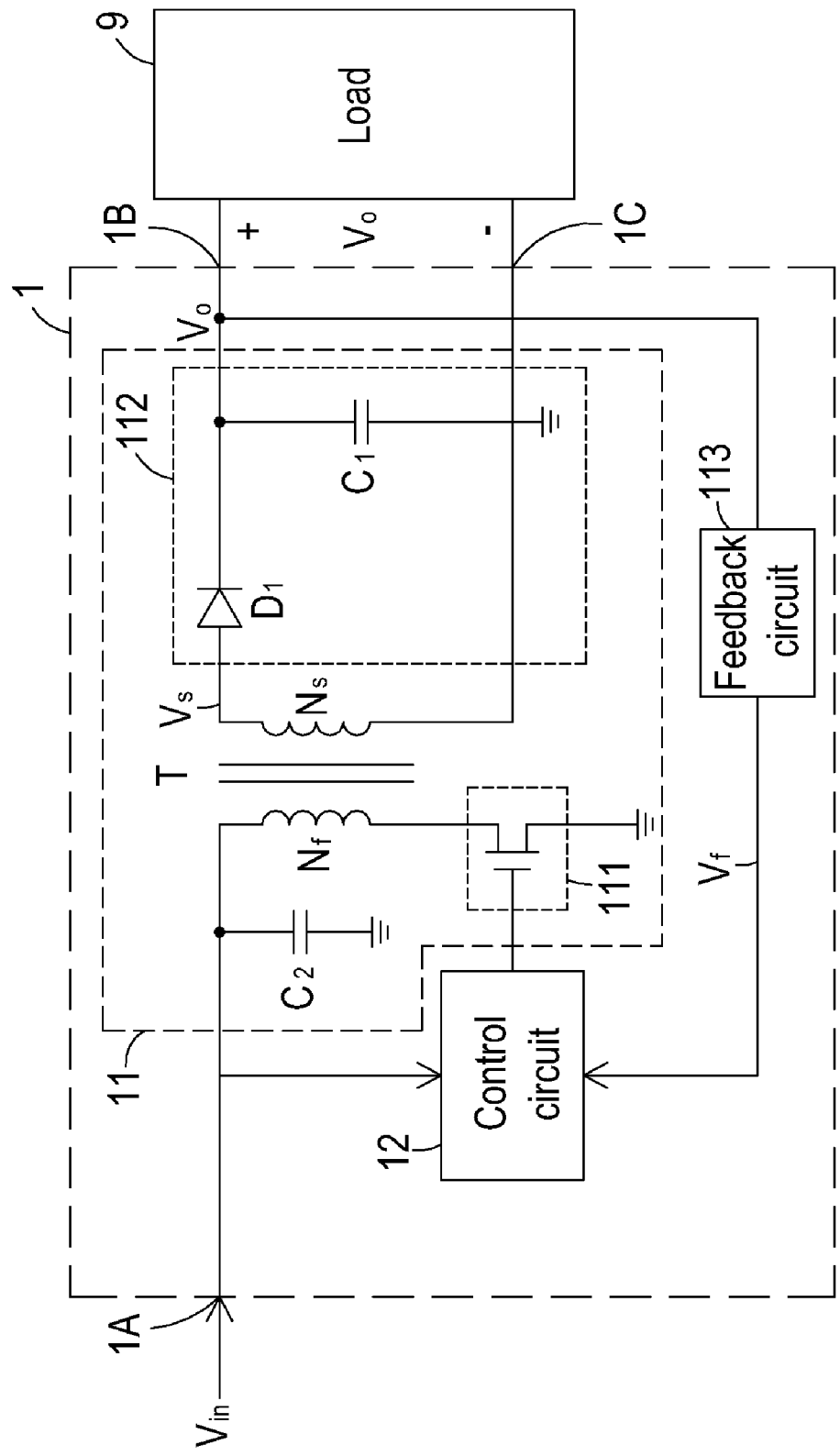
FIG. 1 is a schematic circuit diagram of a switching power conversion circuit according to a first embodiment of the present invention.

FIG. 1 is a schematic circuit diagram of a switching power conversion circuit according to a first preferred embodiment of the present invention. In this embodiment, the switching power conversion circuit 1 is a fly-back switching power conversion circuit, but it is not limited thereto. After an input voltage $V_{in}$ is received, the input voltage $V_{in}$ is converted by the switching power conversion circuit 1 into an output voltage $V_o$ required for powering a load 9.

As shown in FIG. 1, the switching power conversion circuit 1 principally comprises a power circuit 11, a control circuit 12 and a feedback circuit 113. The power circuit 11 is connected to the control circuit 12 and the load 9. The power circuit 11 comprises a first magnetic element, a switching circuit 111 and a rectifying and filtering circuit 112. In this embodiment, the first magnetic element is a transformer T. The primary winding assembly $N_f$ of the transformer T is connected to the input terminal 1A of the switching power conversion circuit 1. The input voltage $V_{in}$ is received by the primary winding assembly $N_f$ and then magnetically transmitted to the secondary winding assembly $N_s$ of the transformer T. As such, the secondary winding assembly $N_s$ generates a conversion voltage $V_s$. The switching circuit 111 is connected to the control circuit 12, the primary winding assembly $N_f$ and a common terminal. Under control of the control circuit 12, the switching circuit 111 is alternately conducted or shut off. As such, the electric energy received by the primary winding assembly $N_f$ will be magnetically transmitted to the secondary winding assembly $N_s$ of the transformer T.

When the switching circuit 111 is alternately conducted or shut off under control of the control circuit 12, the primary winding assembly $N_f$ or the secondary winding assembly $N_s$ of the transformer T will generate corresponding magnetic flux change according to the formula $B=V_{in} \times T_{on}/(T_s \times A)$, in which B is the magnetic flux generated on the primary winding assembly $N_f$ or the secondary winding assembly $N_s$, $V_{in}$ is the input voltage received at the input terminal 1A of the switching power conversion circuit 1, $T_{on}$ is the on duration of the switching circuit 111, $T_s$ is the coil turn of the primary winding assembly $N_f$ or the secondary winding assembly $N_s$, and A is an effective area passing through the magnetic flux. Since the coil turn $T_s$ of the primary winding assembly $N_f$ or the secondary winding assembly $N_s$ and the effective area A are determined after the switching power conversion circuit 1 is fabricated, the magnetic flux B is changed with the input voltage $V_{in}$ and the on duration $T_{on}$ of the switching circuit 111.

The rectifying and filtering circuit 112 is connected between the secondary winding assembly $N_s$, and a first output terminal 1B and a second output terminal 1C of the switching power conversion circuit 1. The first output terminal 1B and the second output terminal 1C are connected to both ends of the load 9. The rectifying and filtering circuit 112 is used for rectifying and filtering the conversion voltage $V_s$, thereby generating the output voltage $V_o$. The rectifying and filtering circuit 112 comprises a first diode $D_1$ and a first capacitor $C_1$. The positive end of the first diode $D_1$ is connected to the secondary winding assembly $N_s$. The negative end of the first diode $D_1$ is connected to the first capacitor $C_1$ and an end of the load 9. The first capacitor $C_1$ is also connected to the other end of the load 9. In addition, the power circuit 11 further includes a second capacitor $C_2$. The second capacitor $C_2$ is connected to the input terminal 1A of the switching power conversion circuit 1 and the primary winding assembly $N_f$. The second capacitor $C_2$ is used for filtering the input voltage $V_{in}$.

The input terminal of the feedback circuit 113 is connected to the output terminal of the rectifying and filtering circuit 112. The output terminal of the feedback circuit 113 is connected to the control circuit 12. According to the output voltage $V_o$, the feedback circuit 113 generates a feedback signal $V_f$ to the control circuit 12.

The control circuit 12 is connected to the input terminal 1A of the switching power conversion circuit 1, the feedback circuit 113 and the switching circuit 111. The control circuit 12 is used for adjusting the on duration and the off duration of the switching circuit 111, so that the magnitude of the output voltage $V_o$ is maintained at a rated voltage. In this embodiment, the off duration of the switching circuit 111 is maintained at a constant interval under control of the control circuit 12. According to the feedback signal $V_f$, the on duration of the switching circuit 111 is adjusted by the control circuit 12. According to the magnitude of the input voltage $V_{in}$, the on duration of the switching circuit 111 is adjusted to be a specified interval, which is smaller than a maximum on duration. Since the maximum on duration of the switching circuit 111 is varied with the magnitude of the input voltage $V_{in}$, the real on duration is correlated with the input voltage $V_{in}$ according to a formula $T_{on} \leq K/V_{in}$, in which K is an adjustable parameter. Since the on duration $T_{on}$ is restricted by the input voltage $V_{in}$, a ratio of the on duration $T_{on}$ to the input voltage $V_{in}$ is also restricted. As a consequence, the relation between the input voltage $V_{in}$ and the on duration $T_{on}$ of the switching circuit 111 may be changed by adjusting the adjustable parameter K under control of the control circuit 12.

In the above embodiment, when the switching circuit 111 is alternately conducted or shut off under control of the control circuit 12, the primary winding assembly $N_f$ or the secondary winding assembly $N_s$ of the transformer T will generate corresponding magnetic flux according to the formula $B=V_{in} \times T_{on}/(T_s \times A)$. Since the coil turn $T_s$ of the primary winding assembly $N_f$ or the secondary winding assembly $N_s$ and the effective area A are determined after the switching power conversion circuit 1 is fabricated, the magnetic flux B is changed with the input voltage $V_{in}$ and the on duration $T_{on}$ of the switching circuit 111. According to the magnitude of the input voltage $V_{in}$, the on duration of the switching circuit 111 is adjusted to be a specified interval, which is smaller than a maximum on duration. The real on duration (i.e. the specified interval) is correlated with the input voltage $V_{in}$ according to a formula $T_{on} < K/V_{in}$. In a case that $T_{on}$ is replaced by $K/V_{in}$, the $B=V_{in} \times T_{on}/(T_s \times A)$ may be deduced as a new formula $B \leq K/(T_s \times A)$. Since the coil turn $T_s$ and the effective area A are known value, the magnetic flux B is changed with the adjustable parameter K and restricted under an upper limit. In other words, by predetermining the adjustable parameter K under control of the control circuit 12, the magnetic flux B is restricted under the maximum saturation magnetic flux. Under this circumstance, when the switching circuit 111 is alternately conducted or shut off under control of the control circuit 12, the primary winding assembly $N_f$ or the secondary winding assembly $N_s$ of the transformer T fails to be saturated. As a consequence, the possibility of immediately burning out the transformer T and other components of the switching power conversion circuit 1 will be largely reduced.

Figure 2:
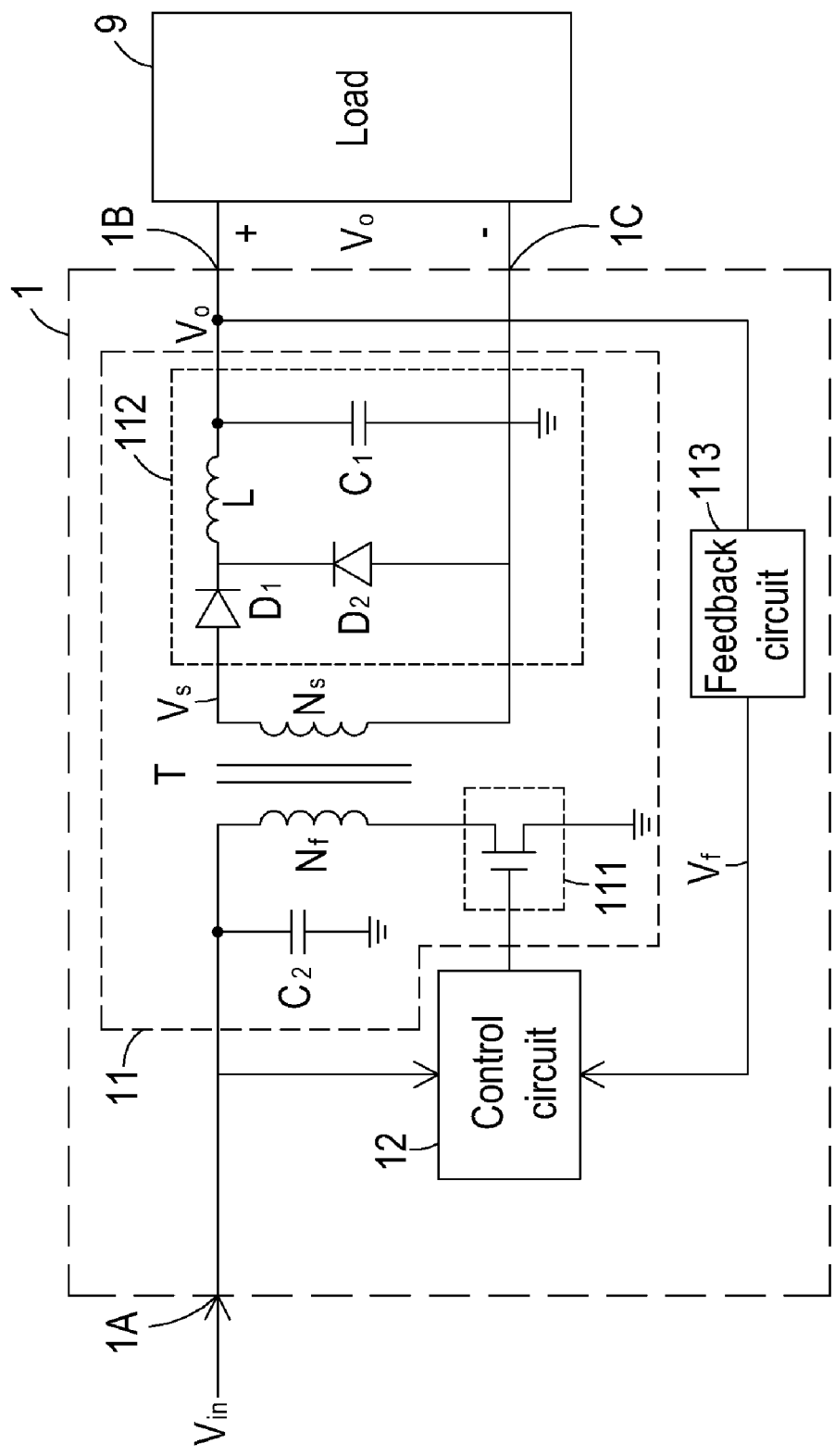
FIG. 2 is a schematic circuit diagram illustrating a variation example of the switching power conversion circuit according to the first preferred embodiment of the present invention.

FIG. 2 is a schematic circuit diagram illustrating a variation example of the switching power conversion circuit according to the first preferred embodiment of the present invention. In this embodiment, the switching power conversion circuit 1 is a forward switching power conversion circuit, but it is not limited thereto. In comparison with the switching power conversion circuit 1 of FIG. 1, the rectifying and filtering circuit 112 further comprises a second magnetic element and a second diode $D_2$. An example of the second magnetic element is an inductor L. The inductor L is connected to the first diode $D_1$, the first capacitor $C_1$ and the load 9. The inductor L and the capacitor $C_1$ collectively forms a LC resonant circuit, thereby enhancing the filtering efficacy of the rectifying and filtering circuit 112. The negative end of the second diode $D_2$ is connected to the first diode $D_1$ and the inductor L. The positive end of the second diode $D_2$ is connected to the first capacitor $C_1$.

In the above embodiment, when the switching circuit 111 is alternately conducted or shut off under control of the control circuit 12, the inductor L will also generate a magnetic flux change according to the similar formula relating to primary winding assembly $N_f$ or the secondary winding assembly $N_s$ of the transformer T. In other words, the magnetic flux of the inductor L is changed with the input voltage $V_{in}$ and the on duration $T_{on}$ of the switching circuit 111. According to the magnitude of the input voltage $V_{in}$, the on duration of the switching circuit 111 is adjusted to be a specified interval, which is smaller than a maximum on duration. The real on duration (i.e. the specified interval) is correlated with the input voltage $V_{in}$ according to a formula $T_{on} \leq K/V_{in}$. In other words, by predetermining the adjustable parameter K under control of the control circuit 12, the magnetic flux of the inductor L is restricted under the maximum saturation magnetic flux. As a consequence, the possibility of immediately burning out the inductor L of the switching power conversion circuit 1 will be largely reduced.

Figure 3:
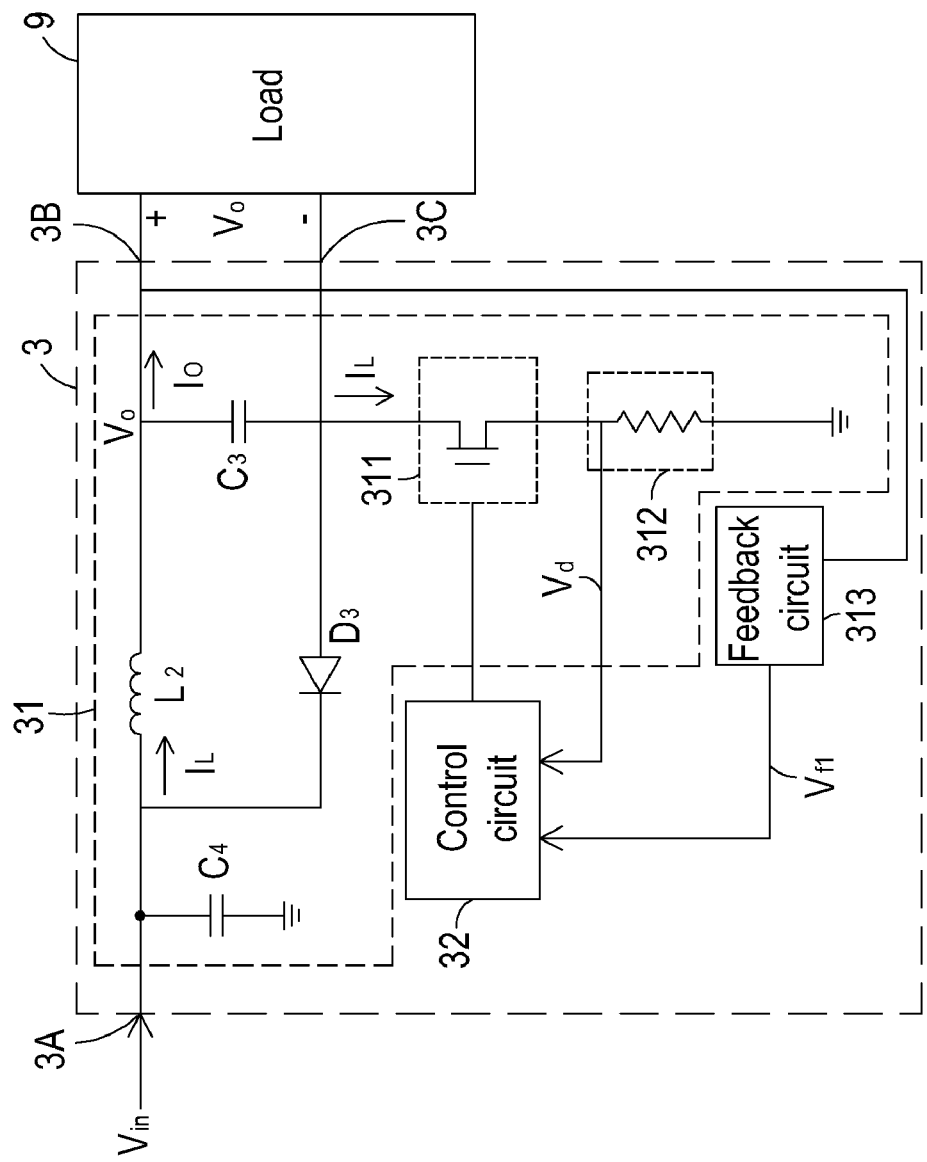
FIG. 3 is a schematic circuit diagram illustrating a switching power conversion circuit according to a second preferred embodiment of the present invention.

FIG. 3 is a schematic circuit diagram illustrating a switching power conversion circuit according to a second preferred embodiment of the present invention. In this embodiment, the switching power conversion circuit 1 is a buck switching power conversion circuit, but it is not limited thereto. After an input voltage $V_{in}$ is received, the input voltage $V_{in}$ is converted by the switching power conversion circuit 3 into an output voltage $V_o$ required for powering a load 9.

As shown in FIG. 3, the switching power conversion circuit 3 principally comprises a power circuit 31, a control circuit 32 and a feedback circuit 313. The power circuit 31 is connected to the control circuit 32 and the load 9. The power circuit 31 comprises a first magnetic element, a first capacitor $C_3$, a switching circuit 311 and a detecting circuit 312. In this embodiment, the first magnetic element is an inductor $L_2$. A first end of the inductor $L_2$ is connected to the input terminal 3A of the switching power conversion circuit 3. After the input voltage $V_{in}$ is received by the inductor $L_2$, an inductor current $I_L$ is generated. A second end of the inductor $L_2$ is connected to the first capacitor $C_3$ and the load 9 such that the inductor current $I_L$ may flows to the first capacitor $C_3$ and the load 9. An end of the first capacitor $C_3$ is connected to the inductor $L_2$ and the load 9. The other end of the first capacitor $C_3$ is connected to the switching circuit 311.

The switching circuit 311 is connected to the load 9, the first capacitor $C_3$, the control circuit 32 and the detecting circuit 312. Under control of the control circuit 32, the switching circuit 311 is alternately conducted or shut off. As such, the inductor $L_2$ and the first capacitor $C_3$ will be charged by the input voltage $V_{in}$ when the switching circuit 311 is conducted; and the inductor $L_2$ discharges the stored energy when the switching circuit 311 is shut off. In other words, by alternately conducting or shut off the switching circuit 311, a magnetic flux change is generated on the inductor $L_2$. At the same time, the output voltage $V_o$, which is equal to the voltage difference across the first output terminal 3B and a second output terminal 3C of the switching power conversion circuit 3, and the load current $I_o$ are transmitted to the load 9.

The detecting circuit 312 is interconnected between the switching circuit 311 and a common terminal. When the switching circuit 311 is conducted, the detecting circuit 312 receives the inductor current $I_L$, thereby generating a detecting voltage $V_d$. In this embodiment, the detecting circuit 312 includes a resistor.

The power circuit 31 further comprises a second capacitor $C_4$ and a first diode $D_3$. An end of the second capacitor $C_4$ is connected to the input terminal 3A of the switching power conversion circuit 3 and the inductor $L_2$. The other end of the second capacitor $C_4$ is connected to the common terminal. The second capacitor $C_2$ is used for filtering the input voltage $V_{in}$. The negative end of the first diode $D_3$ is connected to the second capacitor $C_4$ and the inductor $L_2$. The positive end of the first diode $D_3$ is connected to the first capacitor $C_3$. When the switching circuit 311 is shut off, the first diode $D_3$ provides a discharging path of the inductor $L_2$.

The input terminal of the feedback circuit 313 is connected to the output terminals of the power circuit 31. The output terminal of the feedback circuit 313 is connected to the control circuit 32. According to the output voltage $V_o$, the feedback circuit 313 generates a feedback signal $V_{f1}$ to the control circuit 32.

Figure 4:
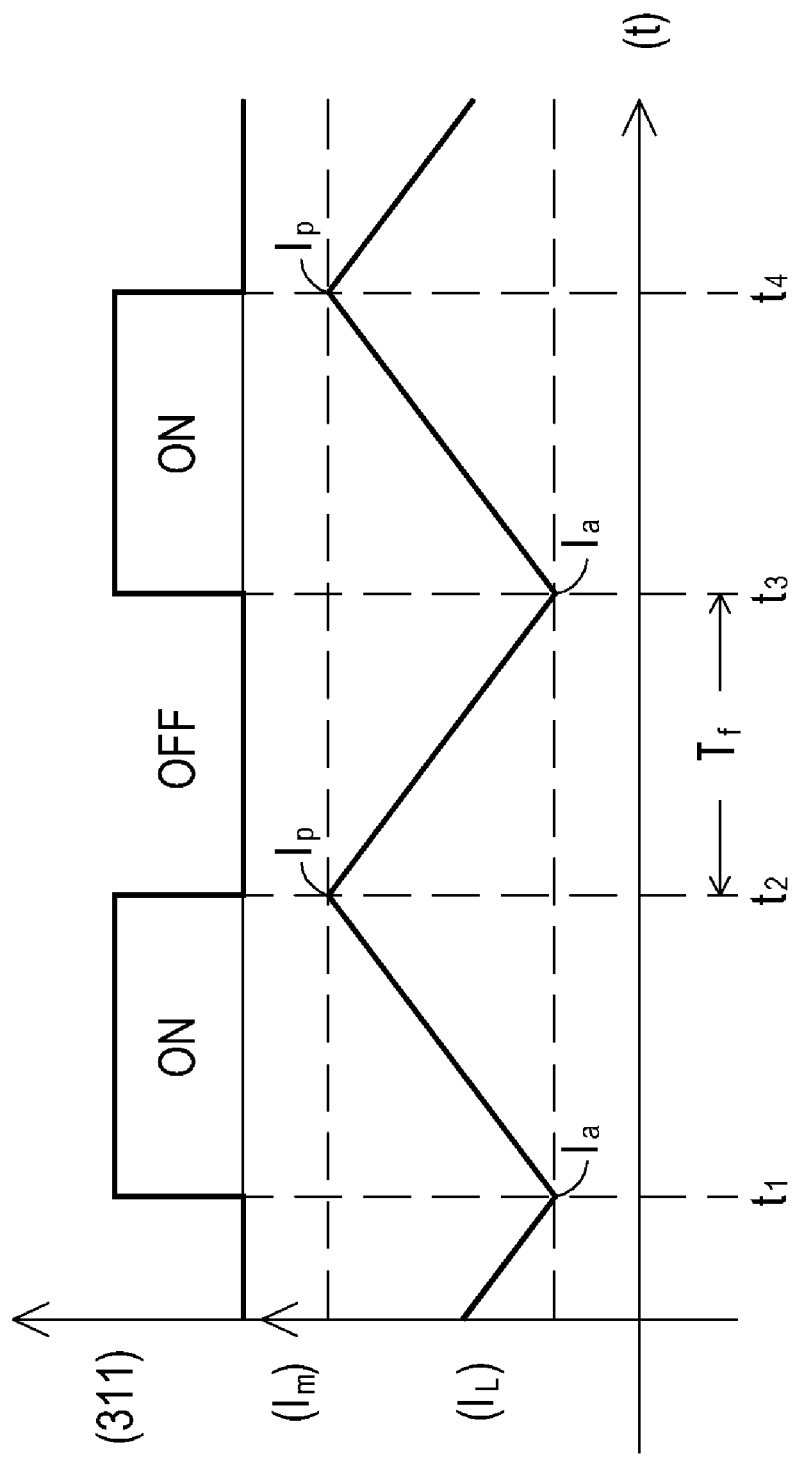
FIG. 4 is a timing waveform diagram schematically illustrating related current signals and the statuses of the switching circuit described in the switching power conversion circuit of FIG. 3.

The input terminal of the control circuit 32 is connected to the detecting circuit 312 and the feedback circuit 313 for receiving the detecting voltage $V_d$ from the detecting circuit 312 and the feedback signal $V_{f1}$ from the feedback circuit 313. The output terminal of the control circuit 32 is connected to a control terminal of the switching circuit 311. The control circuit 32 is used for adjusting the on duration and the off duration of the switching circuit 311, so that the magnitude of the output voltage $V_o$ is maintained at a rated voltage. In this embodiment, the off duration of the switching circuit 311 is maintained at a constant interval under control of the control circuit 32. According to the feedback signal $V_{f1}$, the on duration of the switching circuit 311 is adjusted by the control circuit 32. An upper limit current value $I_m$ (as shown in FIG. 4) has been predetermined by the control circuit 32. According to the detecting voltage $V_d$ from the detecting circuit 312, the control circuit 32 will control the switching circuit 311 to be shut off if the inductor current $I_L$ reaches the current upper limit value $I_m$.

FIG. 4 is a timing waveform diagram schematically illustrating related current signals and the statuses of the switching circuit 311 described in the switching power conversion circuit of FIG. 3. At the time spot $t_1$, the switching circuit 311 is conducted under control of the control circuit 32, so that the electric energy of the input voltage $V_{in}$ is stored into the inductor $L_2$ and the first capacitor $C_3$ (in a charge state). The inductor current $I_L$ of the inductor $L_2$ is gradually increased and divided to flow to the first capacitor $C_3$ and the load 9. Since the switching circuit 311 is conducted, the inductor current $I_L$ may flow to the detecting circuit 312 through the switching circuit 311. According to the magnitude of the inductor current $I_L$, the detecting circuit 312 generates the detecting voltage $V_d$ to the control circuit 32.

At the time spot $t_2$, the inductor current $I_L$ is gradually increased to the upper limit current value $I_m$. Meanwhile, according to the detecting voltage $V_d$, the control circuit 32 realizes that the inductor current $I_L$ reaches the upper limit current value $I_m$. Accordingly, the switching circuit 311 is shut off under control of the control circuit 32. At the moment when the switching circuit 311 is shut off, the peak value $I_p$ of the inductor current $I_L$ is equal to the upper limit current value $I_m$. Meanwhile, the electric energy stored in the inductor $L_2$ begins to discharge through the first diode $D_3$ and thus the inductor current $I_L$ is gradually decreased. Since the off duration of the switching circuit 311 is maintained at a constant interval (e.g. $T_f$) under control of the control circuit 12, the switching circuit 311 is conducted under control of the control circuit 32 at the time spot $t_3$, in which $t_3=t_2+T_f$. At the moment when the switching circuit 311 is conducted, the inductor current $I_L$ reaches a trough current value $I_a$. Meanwhile, the electric energy of the input voltage $V_{in}$ is stored into the inductor $L_2$ and the first capacitor $C_3$ (in the charge state). The inductor current $I_L$ of the inductor $L_2$ is gradually increased. The above procedures are repeated, so that the input voltage $V_{in}$ is converted by the switching power conversion circuit 3 into the output voltage $V_o$ required for powering the load 9.

Please refer to FIG. 3 and FIG. 4. When the switching power conversion circuit 3 provides the output voltage $V_o$ to the load 9, the load current $I_o$ on the load 9 is changed with the peak value $I_p$ and the trough current value $I_a$ of the inductor current $I_L$ according to the formula $I_o=I_a+(I_p-I_a)/2$. In addition, the relation between the peak value $I_p$ and the trough current value $I_a$ may be indicated as $I_a=I_p-(V_o \times T_{off})/L_f$, in which $V_o$ is the output voltage of the switching power conversion circuit 3, $T_{off}$ is the off duration of the switching circuit 311, and $L_f$ is the inductance of the inductor $L_2$. As a consequence, the trough current value $I_a$ is changed with the peak value $I_p$, the output voltage $V_o$, the off duration $T_{off}$ and the inductance $L_f$ of the inductor. Since the inductance $L_f$ is determined after the inductor $L_2$ is fabricated, the off duration $T_{off}$ of the switching circuit 311 is a const interval $T_f$ and the peak value $I_p$ of the inductor current $I_L$ is equal to the upper limit current value $I_m$, the trough current value $I_a$ is only changed with the output voltage $V_o$. Due to the capacitance property of the first capacitor $C_3$, the variation of the output voltage $V_o$ is very tiny and thus the variation of the trough current value $I_a$ is very tiny.

Since the load current $I_o$ on the load 9 is changed with the peak value $I_p$ and the trough current value $I_a$ of the inductor current $I_L$ and the variation of the trough current value $I_a$ is very tiny, the load current $I_o$ is mainly dependent on the peak value $I_p$. Since the peak value $I_p$ of the inductor current $I_L$ is equal to the upper limit current value $I_m$, the peak value $I_p$ of the inductor current $I_L$ may be controlled by adjusting the upper limit current value $I_m$ under control of the control circuit 32. Under this circumstance, the load current $I_o$ can be precisely maintained at a constant value, so that the operation of the load 9 is optimized.

Please refer to FIG. 3 again. Since the switching circuit 311 is located at the low-voltage terminal, no additional bootstrap circuit is required to drive the switching circuit 311 and the switching power conversion circuit 3 is relatively cost-effective. Moreover, since the load current $I_o$ is precisely maintained at a constant value, the operation of the load 9 is optimized.

Figure 5:
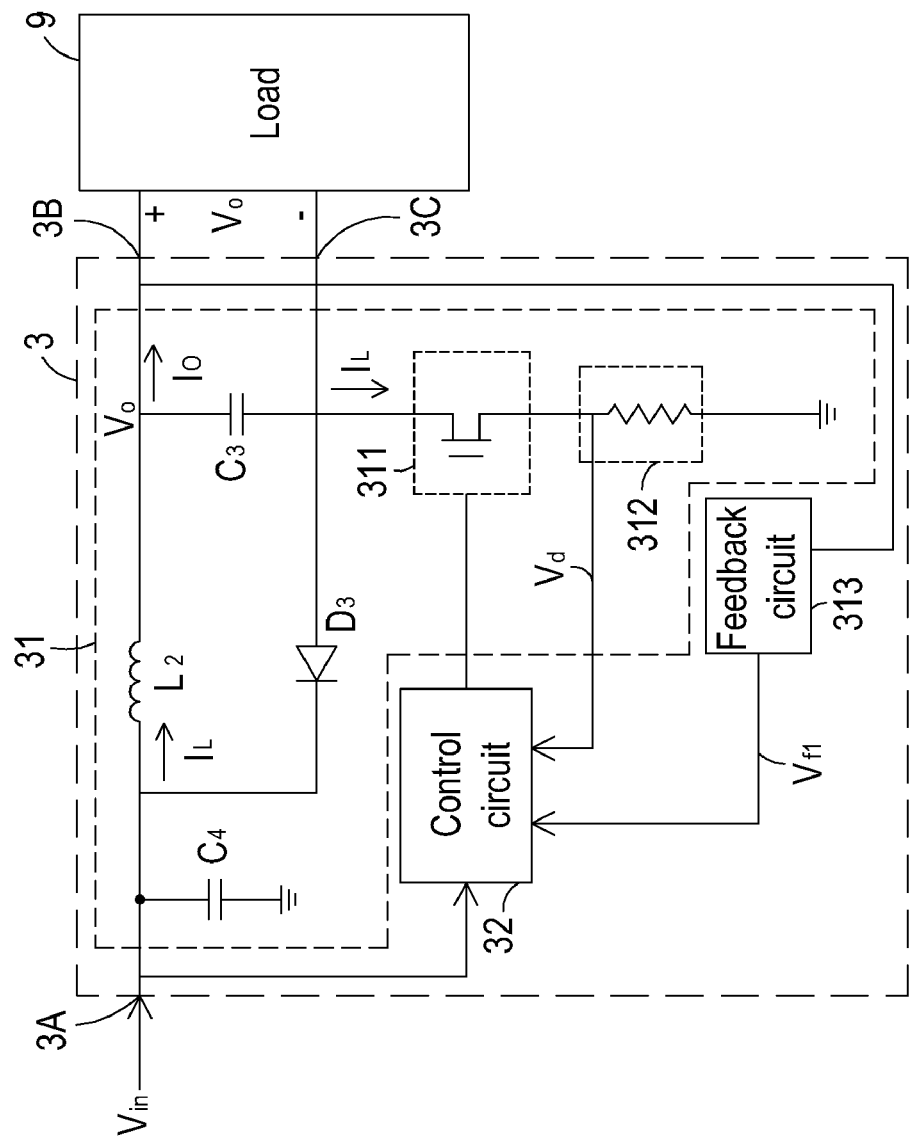
FIG. 5 is a schematic circuit diagram illustrating a variation example of the switching power conversion circuit according to the second preferred embodiment of the present invention.

FIG. 5 is a schematic circuit diagram illustrating a variation example of the switching power conversion circuit according to the second preferred embodiment of the present invention. In comparison with the switching power conversion circuit 3 of FIG. 3, the control circuit 32 is connected to the switching circuit 311, the detecting circuit 312, the feedback circuit 313 and also connected to the input terminal 3A of the switching power conversion circuit 3. Similarly, according to the magnitude of the input voltage $V_{in}$, the on duration of the switching circuit 311 is adjusted to be a specified interval, which is smaller than a maximum on duration under control of the control circuit 32. In this embodiment, the load current $I_o$ can be precisely maintained at a constant value, so that the operation of the load 9 is optimized. In addition, when the switching circuit 311 is alternately conducted or shut off, the magnetic flux of the inductor $L_2$ is restricted under the maximum saturation magnetic flux by predetermining the adjustable parameter K under control of the control circuit 32. For example, the magnetic flux of the inductor $L_2$ is restricted under the maximum saturation magnetic flux. As a consequence, the possibility of immediately burning out the inductor $L_2$ or other components of the switching power conversion circuit 3 will be largely reduced.

Figure 6:
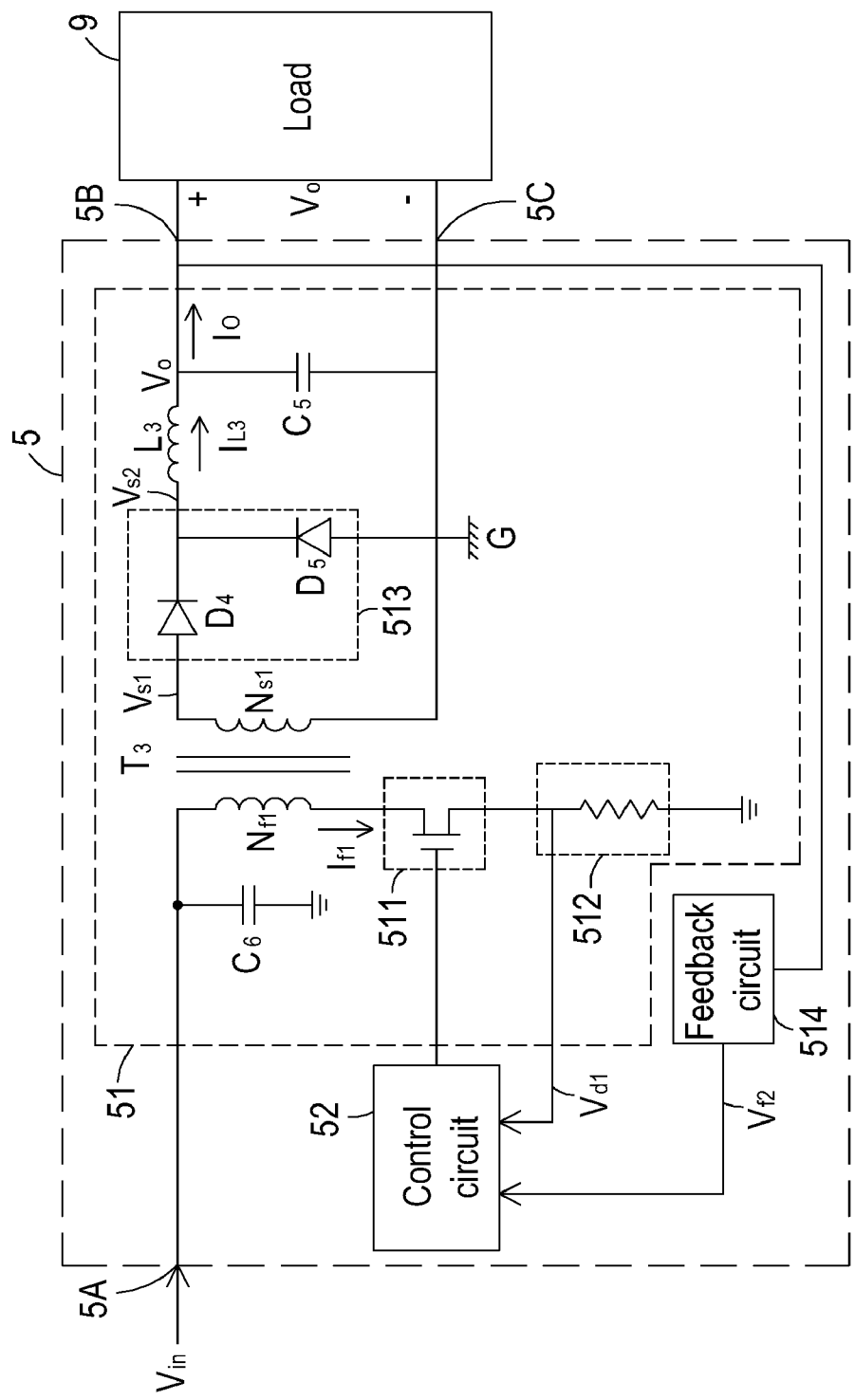
FIG. 6 is a schematic circuit diagram illustrating a switching power conversion circuit according to a third preferred embodiment of the present invention.

FIG. 6 is a schematic circuit diagram illustrating a switching power conversion circuit according to a third preferred embodiment of the present invention. In this embodiment, the switching power conversion circuit 5 is an isolation switching power conversion circuit. After an input voltage $V_{in}$ is received, the input voltage $V_{in}$ is converted by the switching power conversion circuit 5 into an output voltage $V_o$ required for powering a load 9.

As shown in FIG. 6, the switching power conversion circuit 5 principally comprises a power circuit 51, a control circuit 52 and a feedback circuit 514. The power circuit 51 is connected to the control circuit 52 and the load 9. The power circuit 51 comprises a first magnetic element, a first capacitor $C_5$, a switching circuit 511, a detecting circuit 512, a rectifying circuit 513 and a second magnetic element. In this embodiment, the second magnetic element is an isolation transformer $T_3$. The primary winding assembly $N_{f1}$ of the transformer $T_3$ is connected to the input terminal 5A of the switching power conversion circuit 5. The input voltage $V_{in}$ is received by the primary winding assembly $N_{f1}$ and then magnetically transmitted to the secondary winding assembly $N_{s1}$ of the transformer $T_3$. As such, the secondary winding assembly $N_{s1}$ generates a conversion voltage $V_{s1}$. In addition, when the input voltage $V_{in}$ is received by the primary winding assembly $N_{f1}$, a primary current $I_{f1}$ is generated.

The rectifying circuit 513 is connected to the secondary winding assembly $N_{s1}$ of the transformer $T_3$ for rectifying the conversion voltage $V_{s1}$ into a rectified voltage $Vs_2$. In this embodiment, the rectifying circuit 513 comprises a first diode $D_4$ and a second diode $D_5$. The positive end and the negative end of the first diode $D_4$ are respectively connected to the secondary winding assembly $N_{s1}$ of the isolation transformer $T_3$ and the negative end of the second diode $D_5$. The positive end of the second diode $D_5$ is connected to an insulation common terminal G.

In this embodiment, the first magnetic element is an inductor $L_3$. A first end of the inductor $L_3$ is connected to the rectifying circuit 513. After the rectified voltage $Vs_2$ transmitted from the rectifying circuit 513 is received by the inductor $L_3$, an inductor current $I_{L3}$ is generated. A second end of the inductor $L_3$ is connected to the first capacitor $C_5$ and the load 9 such that the inductor current $I_{L3}$ may flows to the first capacitor $C_5$ and the load 9. Due to the inherent property of the isolation transformer $T_3$, the inductor current $I_{L3}$ and the primary current $I_{f1}$ are in a proportional relation. The proportional relation is equal to the turn ratio of the primary winding assembly $N_{f1}$ to the secondary winding assembly $N_{s1}$. Assuming the coil turn of the primary winding assembly $N_{f1}$ is double of the coil turn of the secondary winding assembly $N_{s1}$, the ratio of the inductor current $I_{L3}$ to the primary current $I_{f1}$ is 2:1. An end of the first capacitor $C_5$ is connected to the inductor $L_3$ and the load 9. The other end of the first capacitor $C_5$ is connected to the insulation common terminal G for filtering purpose.

The switching circuit 511 is connected to the control circuit 52, the primary winding assembly $N_{f1}$ of the transformer $T_3$ and the detecting circuit 512. Under control of the control circuit 52, the switching circuit 511 is alternately conducted or shut off. As such, the electric energy received by the primary winding assembly $N_{f1}$ of the transformer $T_3$ will be magnetically transmitted to the secondary winding assembly $N_{s1}$. When the switching circuit 511 is conducted, the inductor $L_3$ and the first capacitor $C_5$ will be charged by the rectified voltage $Vs_2$ and thus the inductor current $I_{L3}$ is generated. When the switching circuit 511 is shut off, the inductor $L_3$ discharges the stored energy. In other words, by alternately conducting or shut off the switching circuit 511, a magnetic flux change is generated on the inductor $L_3$. At the same time, the output voltage $V_o$, which is equal to the voltage difference across the first output terminal 5B and a second output terminal 5C of the switching power conversion circuit 5, and the load current $I_o$ are transmitted to the load 9.

The detecting circuit 512 is interconnected between the switching circuit 511 and a common terminal. When the switching circuit 511 is conducted, the detecting circuit 512 receives the primary current $I_{f1}$, thereby generating a detecting voltage $V_{d1}$. Due to the inherent property of the isolation transformer $T_3$, the inductor current $I_{L3}$ and the primary current $I_{f1}$ are in a proportional relation. In this embodiment, the ratio of the inductor current $I_{L3}$ to the primary current $I_{f1}$ is 2:1. The detecting circuit 512 is composed of a resistor.

The input terminal of the feedback circuit 514 is connected to the output terminals of the power circuit 51. The output terminal of the feedback circuit 514 is connected to the control circuit 52. According to the output voltage $V_o$, the feedback circuit 514 generates a feedback signal $V_{f2}$ to the control circuit 52.

The power circuit 51 further comprises a second capacitor $C_6$. An end of the second capacitor $C_6$ is connected to the input terminal 5A of the switching power conversion circuit 5 and the primary winding assembly $N_{f1}$ of the transformer $T_3$. The other end of the second capacitor $C_6$ is connected to the common terminal. The second capacitor $C_6$ is used for filtering the input voltage $V_{in}$.

Figure 7:
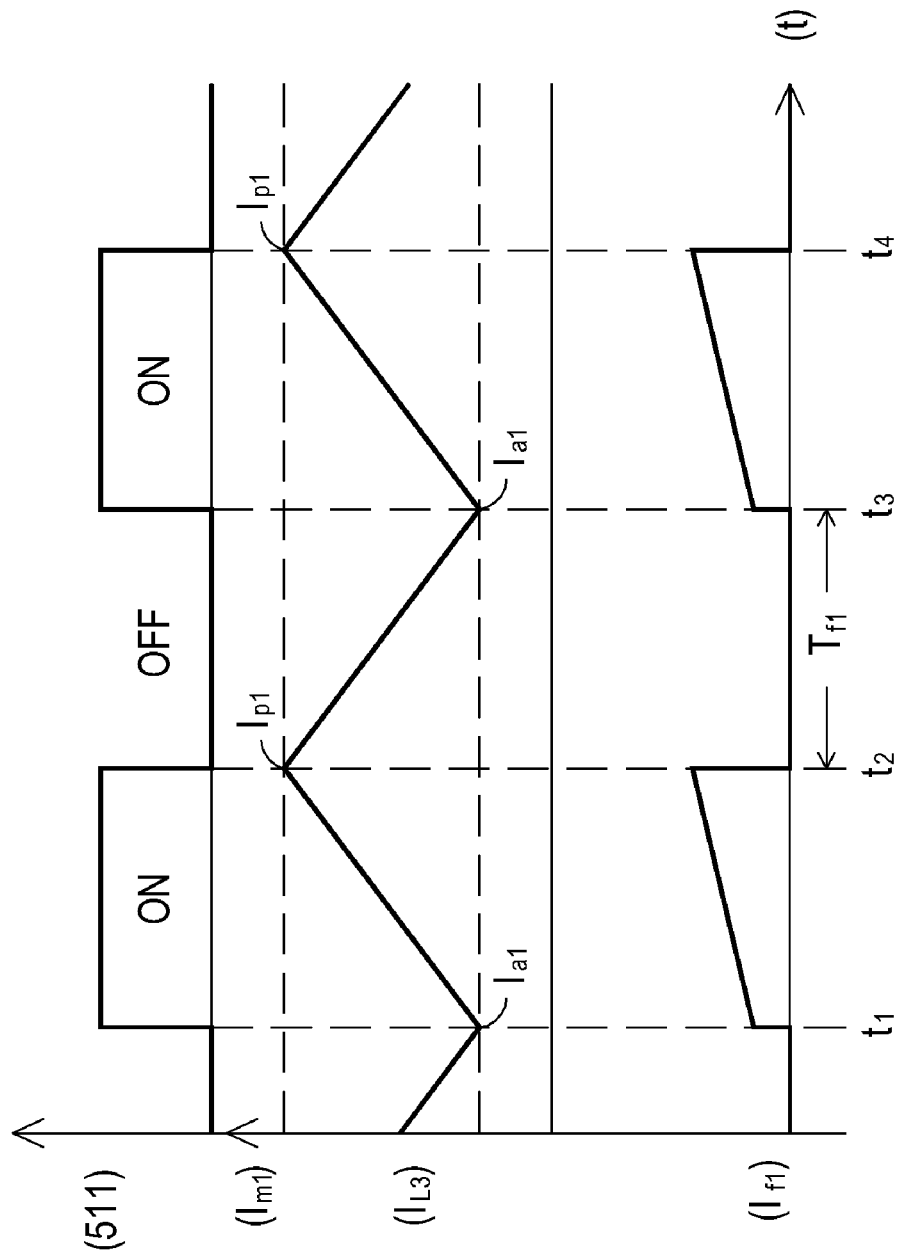
FIG. 7 is a timing waveform diagram schematically illustrating related current signals and the statuses of the switching circuit described in the switching power conversion circuit of FIG. 6.

The input terminal of the control circuit 52 is connected to the detecting circuit 512 and the feedback circuit 514 for receiving the detecting voltage $V_{d1}$ from the detecting circuit 512 and the feedback signal $V_{f2}$ from the feedback circuit 514. The output terminal of the control circuit 52 is connected to a control terminal of the switching circuit 511. The control circuit 52 is used for adjusting the on duration and the off duration of the switching circuit 511, so that the magnitude of the output voltage $V_o$ is maintained at a rated voltage. In this embodiment, the off duration of the switching circuit 511 is maintained at a constant interval under control of the control circuit 52. An upper limit current value $I_{m1}$ (as shown in FIG. 7) has been predetermined by the control circuit 52. According to the detecting voltage $V_{d1}$ from the detecting circuit 512, the control circuit 52 will control the switching circuit 511 to be shut off if the inductor current $I_{L3}$ reaches the current upper limit $I_{m1}$.

FIG. 7 is a timing waveform diagram schematically illustrating related current signals and the statuses of the switching circuit 511 described in the switching power conversion circuit of FIG. 6. At the time spot $t_1$, the switching circuit 511 is conducted under control of the control circuit 52, so that the primary current $I_{f1}$ is gradually increased and flows to the detecting circuit 512 through the switching circuit 511. At the same time, the secondary winding assembly $N_{s1}$ generates a conversion voltage $V_{s1}$. By the rectifying circuit 513, the conversion voltage $V_{s1}$ is rectified into a rectified voltage $Vs_2$, which will charge the inductor $L_3$ and the first capacitor $C_5$. During the charging period, the inductor current $I_{L3}$ is gradually increased. Assuming the coil turn of the primary winding assembly $N_{f1}$ is double of the coil turn of the secondary winding assembly $N_{s1}$, the ratio of the inductor current $I_{L3}$ to the primary current $I_{f1}$ is 2:1.

At the time spot $t_2$, the inductor current $I_{L3}$ is gradually increased to the upper limit current value $I_{m1}$. Meanwhile, according to the detecting voltage $V_{d1}$, the control circuit 52 realizes that the inductor current $I_{L3}$ reaches the upper limit current value $I_m$. Accordingly, the switching circuit 511 is shut off under control of the control circuit 52. At the moment when the switching circuit 511 is shut off, the peak value $I_{p1}$ of the inductor current $I_{L3}$ is equal to the upper limit current value $I_{m1}$.

When switching circuit 511 is shut off at the time spot $t_2$, the electric energy stored in the inductor $L_3$ begins to discharge and thus the inductor current $I_{L3}$ is gradually decreased. Since the off duration of the switching circuit 511 is maintained at a constant interval (e.g. $T_{f1}$) under control of the control circuit 52, the switching circuit 511 is conducted under control of the control circuit 52 at the time spot $t_3$, in which $t_3=t_2+T_{f1}$. At the moment when the switching circuit 511 is conducted, the inductor current $I_{L3}$ reaches a trough current value $I_{a1}$. Meanwhile, the electric energy of the rectified voltage $Vs_2$ is stored into the inductor $L_3$ (in the charge state) and thus the inductor current $I_{L3}$ of the inductor $L_3$ is gradually increased.

Please refer to FIG. 6 and FIG. 7 again. When the switching power conversion circuit 5 provides the output voltage $V_o$ to the load 9, the load current $I_o$ on the load 9 is changed with the peak value $I_{p1}$ and the trough current value $I_{a1}$ of the inductor current $I_L$ according to the formula $I_o=I_{a1}+(I_{p1}-I_{a1})/2$. In addition, the relation between the peak value $I_{p1}$ and the trough current value $I_{a1}$ may be indicated as $I_a=I_{p1}-(V_o\times T_{off})/L_f$, in which $V_o$ is the output voltage of the switching power conversion circuit 5, $T_{off}$ is the off duration of the switching circuit 511, and $L_f$ is the inductance of the inductor $L_3$. As a consequence, the trough current value $I_{a1}$ is changed with the peak value $I_{p1}$, the output voltage $V_o$, the off duration $T_{off}$ and the inductance $L_f$ of the inductor. Since the inductance $L_f$ is determined after the inductor $L_3$ is fabricated, the off duration $T_{off}$ of the switching circuit 511 is a const interval $T_{f1}$ and the peak value $I_{p1}$ of the inductor current $I_{L3}$ is equal to the upper limit current value $I_{m1}$, the trough current value $I_{a1}$ is only changed with the output voltage $V_o$. Due to the capacitance property of the first capacitor $C_5$, the variation of the output voltage $V_o$ is very tiny and thus the variation of the trough current value $I_{a1}$ is very tiny.

Since the load current $I_o$ on the load 9 is changed with the peak value $I_{p1}$ and the trough current value $I_{a1}$ of the inductor current $I_{L3}$ and the variation of the trough current value $I_{a1}$ is very tiny, the load current $I_o$ is mainly dependent on the peak value $I_{p1}$. Since the peak value $I_{p1}$ of the inductor current $I_{L3}$ is equal to the upper limit current value $I_{m1}$, the peak value $I_{p1}$ of the inductor current $I_{L1}$ may be controlled by adjusting the upper limit current value $I_{m1}$ under control of the control circuit 52. Under this circumstance, the load current $I_o$ can be precisely maintained at a constant value, so that the operation of the load 9 is optimized.

Figure 8:
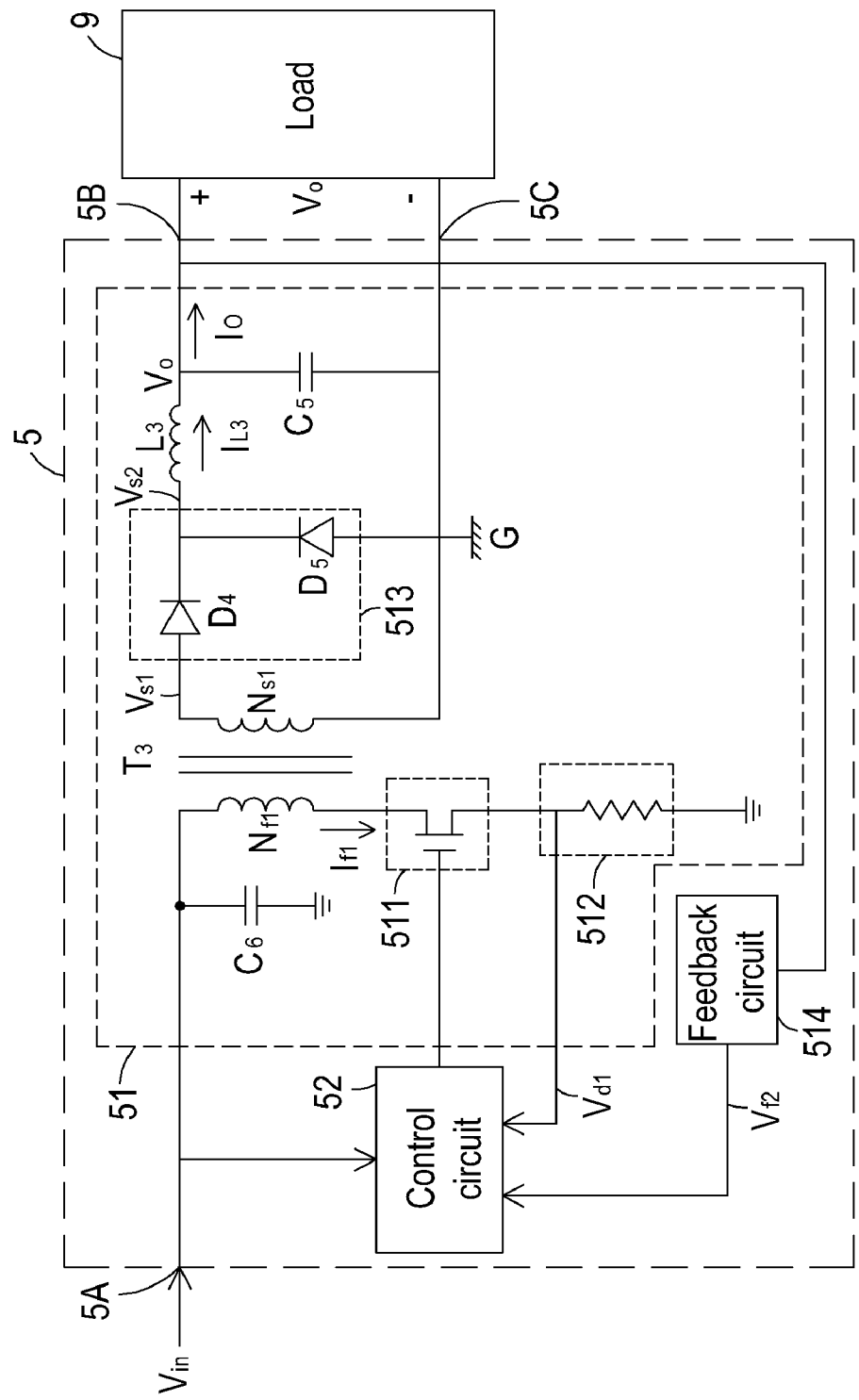
FIG. 8 is a schematic circuit diagram illustrating a variation example of the switching power conversion circuit according to the third preferred embodiment of the present invention.

FIG. 8 is a schematic circuit diagram illustrating a variation example of the switching power conversion circuit according to the third preferred embodiment of the present invention. In comparison with the switching power conversion circuit 5 of FIG. 6, the control circuit 52 is connected to the switching circuit 511, the detecting circuit 512, the feedback circuit 514 and also connected to the input terminal 5A of the switching power conversion circuit 5. Similarly, according to the magnitude of the input voltage $V_{in}$, the on duration of the switching circuit 511 is adjusted to be a specified interval, which is smaller than a maximum on duration under control of the control circuit 52. In this embodiment, the load current $I_o$ can be precisely maintained at a constant value, so that the operation of the load 9 is optimized. In addition, when the switching circuit 511 is alternately conducted or shut off, the magnetic fluxes of the first and second magnetic elements are restricted under the maximum saturation magnetic flux. As a consequence, the possibility of immediately burning out the components of the switching power conversion circuit 5 will be largely reduced.

From the above description, the on duration of the switching circuit is adjusted to be a specified interval smaller than a maximum on duration under control of the control circuit according to the magnitude of the input voltage. When the switching circuit is alternately conducted or shut off, the magnetic fluxes of the magnetic element is restricted under the maximum saturation magnetic flux. As a consequence, the possibility of immediately burning out the components of the switching power conversion circuit will be largely reduced Moreover, since the switching circuit is located at the low-voltage terminal, no additional bootstrap circuit is required to drive the switching circuit and the switching power conversion circuit is relatively cost-effective. Moreover, since the load current is precisely maintained at a constant value, the operation of the load is optimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switching power conversion circuit for converting an input voltage into an output voltage and issuing said output voltage to a load, said switching power conversion circuit comprising:
    a power circuit interconnected between an input terminal of said switching power conversion circuit and said load, and comprising a switching circuit and a first magnetic element, wherein said first magnetic element generates a magnetic flux change by alternately conducting or shutting off said switching circuit, so that said input voltage is converted into said output voltage by said power circuit;
    a feedback circuit having an input terminal connected to an output terminal of said power circuit, wherein said feedback circuit generates a feedback signal according to said output voltage; and
    a control circuit connected to said input terminal of said switching power conversion circuit, said switching circuit and an output terminal of said feedback circuit for controlling an on duration and an off duration of said switching circuit, thereby maintaining said output voltage at a rated voltage, wherein said off duration of said switching circuit is maintained at a constant interval under control of said control circuit, said on duration of said switching circuit is adjusted by said control circuit according to said feedback signal, and said on duration of said switching circuit is adjusted to be a specified interval smaller than a maximum on duration according to the magnitude of said input voltage.

2. The switching power conversion circuit according to claim 1 wherein said first magnetic element is connected to said input terminal of said switching power conversion circuit for converting said input voltage into a conversion voltage.

3. The switching power conversion circuit according to claim 2 wherein said first magnetic element is a transformer, and said switching circuit is interconnected between said transformer and a common terminal.

4. The switching power conversion circuit according to claim 2 further comprising a rectifying and filtering circuit, which is interconnected between said first magnetic element and said load for rectifying and filtering said conversion voltage and generating said output voltage, and said rectifying and filtering circuit includes a first diode and a first capacitor, wherein the positive end of said first diode is connected to said first magnetic element, the negative end of said first diode is connected to an end of said first capacitor and said load, and the other end of said first capacitor is connected to a common terminal.

5. The switching power conversion circuit according to claim 1 wherein said first magnetic element is connected to said input terminal of said switching power conversion circuit, and said first magnetic element generates a load current to said load by alternately conducting or shutting off said switching circuit.

6. The switching power conversion circuit according to claim 5 wherein said first magnetic element is an inductor.

7. The switching power conversion circuit according to claim 5 further comprising a first capacitor and a detecting circuit, wherein an end of said first capacitor is connected to said first magnetic element and said load, and the other end of said first capacitor is connected to said switching circuit, an end of said detecting circuit is connected to said control circuit and said switching circuit, the other end of said detecting circuit is connected to a common terminal, and said detecting circuit receives a current generated by said first magnetic element when the switching circuit is conducted, thereby generating a detecting voltage.

8. The switching power conversion circuit according to claim 7 wherein an upper limit current value is predetermined by said control circuit, wherein if said current generated by said first magnetic element reaches said current upper limit value, said switching circuit is shut off under control of said control circuit according to said detecting voltage, so that said load current is kept constant.

9. The switching power conversion circuit according to claim 7 further comprising a first diode, wherein the negative end of said first diode is connected to said first magnetic element, and the positive end of said first diode is connected to said first capacitor, thereby providing a discharging path of said first magnetic element.

10. The switching power conversion circuit according to claim 1 further comprising a second magnetic element, which is connected to said input terminal of said switching power conversion circuit for converting said input voltage into a conversion voltage.

11. The switching power conversion circuit according to claim 10 wherein said second magnetic element is an isolation transformer having a primary winding assembly and a secondary winding assembly.

12. The switching power conversion circuit according to claim 11 further comprising a rectifying circuit, which is connected to said second magnetic element for rectifying said conversion voltage into a rectified voltage, wherein said rectifying circuit comprises a first diode and a second diode, the positive end and the negative end of said first diode are respectively connected to said second magnetic element and said first magnetic element, and the positive end and the negative end of said second diode are respectively connected to said first magnetic element and an insulation common terminal.

13. The switching power conversion circuit according to claim 11 wherein said first magnetic element is an inductor interconnected between said rectifying circuit and said load, wherein when said switching circuit is conducted, said inductor is charged by said rectified voltage and generates a current, and when said switching circuit is shut off, said inductor discharges such that said output voltage and a load current is transmitted to said load.

14. The switching power conversion circuit according to claim 12 further comprising a first capacitor, wherein an end of said first capacitor is connected to said first magnetic element and said load, and the other end of said first capacitor is connected to an insulation common terminal.

15. The switching power conversion circuit according to claim 12 wherein said switching circuit is connected to said second magnetic element.

16. The switching power conversion circuit according to claim 15 further comprising a detecting circuit, wherein an end of said detecting circuit is connected to said control circuit and said switching circuit, the other end of said detecting circuit is connected to a common terminal, and when said switching circuit is conducted, said detecting circuit receives a primary current generated by said primary winding assembly of said second magnetic element and senses said current generated by said first magnetic element, thereby generating a detecting voltage according to said current generated by said first magnetic element, wherein said primary current and said current generated by said first magnetic element are in a proportional relation.

17. The switching power conversion circuit according to claim 16 wherein an upper limit current value is predetermined by said control circuit, wherein if said current generated by said first magnetic element reaches said current upper limit value, said switching circuit is shut off under control of said control circuit according to said detecting voltage, so that said load current is kept constant.

18. The switching power conversion circuit according to claim 16 wherein said proportional relation is equal to the turn ratio of said primary winding assembly to said secondary winding assembly.

19. The switching power conversion circuit according to claim 1 wherein said maximum on duration is varied according to the magnitude of said input voltage, and the relation between said input voltage and said on duration of said switching circuit is changed by adjusting an adjustable parameter under control of said control circuit.

20. The switching power conversion circuit according to claim 1 further comprising a second capacitor, wherein an end of said second capacitor is connected to said input terminal of said switching power conversion circuit, and the other end of said second capacitor is connected to a common terminal for filtering said input voltage.

* * * * *